United States Patent
Chaudhuri et al.

(10) Patent No.: US 10,009,221 B2
(45) Date of Patent: Jun. 26, 2018

(54) SYSTEM AND METHOD FOR FACILITATING DESIGN CONFIGURATION AND MANAGEMENT OF DATA CENTER

(71) Applicant: Tata Consultancy Services Limited, Maharashtra (IN)

(72) Inventors: Subhrojyoti Roy Chaudhuri, Maharashtra (IN); Harrick Mayank Vin, Maharashtra (IN); Jyothi Lolla, Maharashtra (IN); Amrish Shashikant Pathak, Maharashtra (IN); Rahul Ramesh Kelkar, Maharashtra (IN)

(73) Assignee: TATA CONSULTANCY SERVICES LIMITED (IN)

( * ) Notice: Subject to any disclaimer, the term of this patent is extended or adjusted under 35 U.S.C. 154(b) by 231 days.

(21) Appl. No.: 14/514,761

(22) Filed: Oct. 15, 2014

(65) Prior Publication Data

US 2015/0106485 A1      Apr. 16, 2015

(30) Foreign Application Priority Data

Oct. 15, 2013  (IN) .......................... 3236/MUM/2013

(51) Int. Cl.
*G06F 15/177*   (2006.01)
*H04L 12/24*    (2006.01)
*H04L 12/26*    (2006.01)

(52) U.S. Cl.
CPC ........ *H04L 41/0803* (2013.01); *H04L 41/145* (2013.01); *H04L 41/0866* (2013.01); *H04L 43/50* (2013.01)

(58) Field of Classification Search
CPC ............... H04L 41/145; H04L 41/0803; H04L 41/0866; H04L 43/50
See application file for complete search history.

(56) References Cited

U.S. PATENT DOCUMENTS 8,595,262 B1 * 11/2013 Hayden ............. G06F 17/30545
                                                              370/252
2007/0198383 A1   8/2007 Dow et al.
(Continued)

FOREIGN PATENT DOCUMENTS

WO    WO/2011/014827    2/2011

OTHER PUBLICATIONS

Cisco, "Mitigate Risk for Data Center Network Migration", Cisco Data Center Solution Brief, 2014 6 pages.
(Continued)

*Primary Examiner* — Philip Chea
*Assistant Examiner* — Robert B McAdams
(74) *Attorney, Agent, or Firm* — Hayes Soloway P.C.

(57) ABSTRACT

System(s) and method(s) for facilitating design configuration of data center to provide management of the data center is disclosed. Input parameters providing design and operational requirements are received. Based on the input parameters, objectives are determined. The objectives refer to one or more technical requirements with respect to plurality of phases associated with the life cycle of the data center. The objectives are then used to create a generic configuration with respect to one or more services associated with the life cycle. The generic configuration is mapped with a predefined set of configuration stored in a knowledge repository in order to obtain a technology specific format. The generic configuration is further used to design a tool specific configuration to provide management of each phase of the life cycle of the data center.

17 Claims, 6 Drawing Sheets

(56) References Cited

U.S. PATENT DOCUMENTS

| | | | |
|---|---|---|---|
| 2009/0113323 A1* | 4/2009 | Zhao | G06Q 10/10 715/764 |
| 2010/0125664 A1* | 5/2010 | Hadar | G06F 9/5072 709/224 |
| 2011/0202655 A1* | 8/2011 | Sharma | G06Q 10/06 709/224 |
| 2013/0238795 A1* | 9/2013 | Geffin | G06F 1/206 709/224 |

OTHER PUBLICATIONS

Chawla, "A successful data center migration" Infosys, Apr. 2009, 44 pages.
Whitepaper, "Datacenter Migration" Netmagic Solutions Pvt. Ltd, 2012, 7 pages.
Paul Penny, "Data Center Migration—Planning is Essential" Nov. 7, 2012, 7 pages.
Justin Meza, et al; "Lifecycle-based Data Center Design"; HP Laboratories HPL-2010-117, 2010, 11 pages.

* cited by examiner

SYSTEM AND METHOD FOR FACILITATING DESIGN CONFIGURATION AND MANAGEMENT OF DATA CENTER

CROSS-REFERENCE TO RELATED APPLICATIONS AND PRIORITY

The present application claims priority from Indian Patent application No. 3236/MUM/2013 filed on the 15 Oct. 2013.

TECHNICAL FIELD

The present disclosure in general relates to a method and system for facilitating design configuration of data center. More particularly, the present disclosure relates to system and method to provide management of data center.

BACKGROUND

Present era deals with vast amount of information. Well organized data centers plays a vital role in managing day to day tasks of one or more entities to completely utilize and manage the vast amount of information. The present data centers are designed in such a manner so as to meet Service Level Agreements (SLA) of the stakeholders associated with the organization. Rapid evolution of data centers along multiple dimensions such as business models, standards and processes, tools and technologies have contributed greatly to their being extremely complex systems to operate on and manage. Efficient management of life cycle of a data center in itself is a complicated task. It requires tremendous effort while selecting appropriate technical deployments to ensure over the accurate operations of the data center in order to meet satisfaction level of a stakeholder.

So far many organizations provide solutions in order to give assurance regarding an efficient management of a data center's life cycle. However, such solutions still lacks in providing access to explicated domain knowledge used for creating an end to end strategy. The well-known solutions also fail in creating technology independent solutions retarget able to third party technologies. Also, there are no means to create solution that is traceable from higher level goals to technology specific implementation in case the solution is created by integrating products from multiple vendors.

Further, the variety of solutions that are commercially available does not provide complete management of design and deployment of the data center. The known approaches lacks in analyzing stake holder's issue. They are also not capable in identifying and rectifying defects or issues in an automatic manner. Rather, manual efforts are still needed. Well planned reporting is still needed in order to furnish on time notifications to various stake holders with regard to various activities involved in the data center's life cycle operations.

SUMMARY OF THE INVENTION

This summary is provided to introduce aspects related to system(s) and method(s) for facilitating design configuration for providing management of the data center and the aspects are further described below in the detailed description. This summary is not intended to identify essential features of the claimed subject matter nor is it intended for use in determining or limiting the scope of the claimed subject matter.

Embodiments of the present disclosure provide a system and method for facilitating design configuration of a data center for providing management of the data center. Briefly described, in architecture, one embodiment of the system, among others, can be implemented as follows. The system includes a knowledge repository, a processor, and a memory coupled to the processor, wherein the processor executes a plurality of modules stored in the memory. The plurality of modules comprise: a receiving module configured to receive input parameters from a user, wherein the input parameters comprise design and operational requirements associated with management of the data center; a determining module configured to determine objectives by using the input parameters, wherein the objectives refer to at least one technical requirement with respect to each phase of the plurality of phases of a life cycle of the data center; a creating module configured to create a generic configuration with respect to at least one service associated with the life cycle based on the objectives; a mapping module configured to map the generic configuration with a predefined set of configuration in order to obtain a technology specific format, wherein the predefined set of configuration is stored in the knowledge repository; and a designing module configured to design a tool specific configuration by using the technology specific format, wherein the tool specific configuration provides management of each phase of the life cycle of the data center.

The present disclosure can also be viewed as providing s method for facilitating design configuration of a data center for providing management of the data center. In this regard, one embodiment of such a method, among others, can be broadly summarized by the following steps: receiving input parameters from a user, wherein the input parameters comprise design and operational requirements associated with management of the data center; determining objectives based on the input parameters, wherein the objectives refer to at least one technical requirement with respect to each phase from plurality of phases associated with a life cycle of the data center; creating a generic configuration with respect to at least one service associated with the life cycle based on the objectives; mapping the generic configuration with a predefined set of configuration in order to obtain a technology specific format, wherein the predefined set of configuration is stored in a knowledge repository; and designing a tool specific configuration by using the technology specific format, wherein the tool specific configuration provides management of each phase of the life cycle of the data center.

The present disclosure can also be viewed as providing a non-transitory computer readable medium embodying a program executable in a computing device. Briefly described, in architecture, one embodiment of the program executable in the computing device among others, can be implemented as follows. The program comprises: a program code for receiving input parameters from a user, wherein the input parameters comprise design and operational requirements associated with management of a data center; a program code for determining objectives by using the input parameters, wherein the objectives refer to at least one technical requirement with respect to each phase of plurality of phases associated with a life cycle of the data center; a program code for creating a generic configuration with respect to at least one service associated with the life cycle based on the objectives; a program code for mapping the generic configuration with a predefined set of configuration in order to obtain a technology specific format, wherein the predefined set of configuration is stored in a knowledge repository; and a program code for designing a tool specific configuration by using the technology specific format, wherein the tool specific configuration provides management of each phase of the life cycle of the data center.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

While aspects of described system(s) and method(s) for facilitating design configuration for providing management of the data center is shown may be implemented in any number of different computing systems, environments, and/or configurations, the embodiments are described in the context of the following exemplary system.

Figure 1:
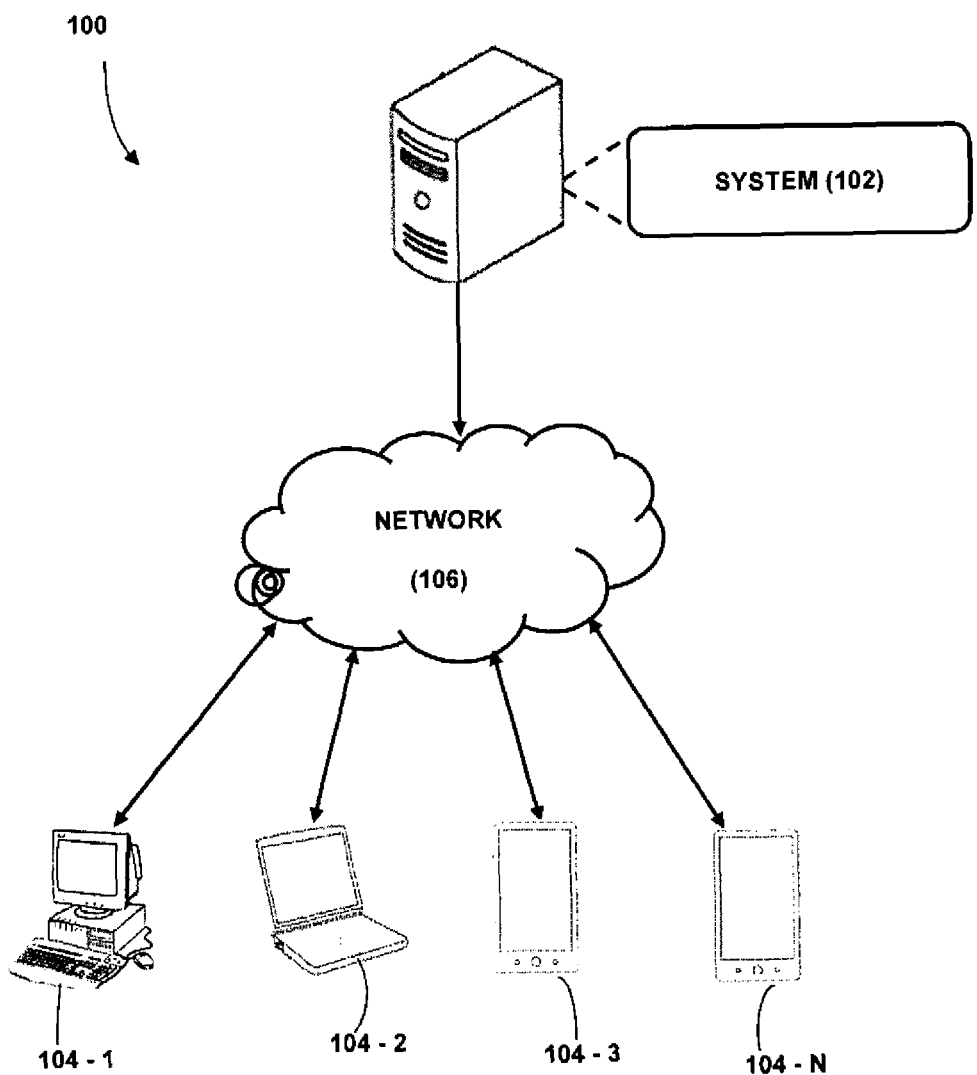
FIG. 1 illustrates a network implementation of a system for facilitating design configuration for providing management of the data center is shown, in accordance with an embodiment of the present subject matter.

Referring now to FIG. 1, a network implementation 100 of system 102 for facilitating design configuration for providing management of the data center is shown. The system facilitates in creating a comprehensive solution for managing all aspects of a data center designs and operations life cycle. The system facilitates in understanding situational needs through evaluation of stakeholders, Service Level Agreement (SLAs), deployment technologies such as servers, operating systems, databases and alike. The system assists in identifying the objectives of the individual technologies supporting each phase of the data center life cycle. The system further facilitates in creating a generic configuration based on standard practices that will be most suitable for a given context. The system further carries out an actual configuration of the individual technologies corresponding to each phase of the life cycle by incorporating the corresponding generic configuration.

Although the present subject matter is explained considering that the system 102 is implemented as an application on a server, it may be understood that the system 102 may also be implemented in a variety of computing systems, such as a laptop computer, a desktop computer, a notebook, a workstation, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
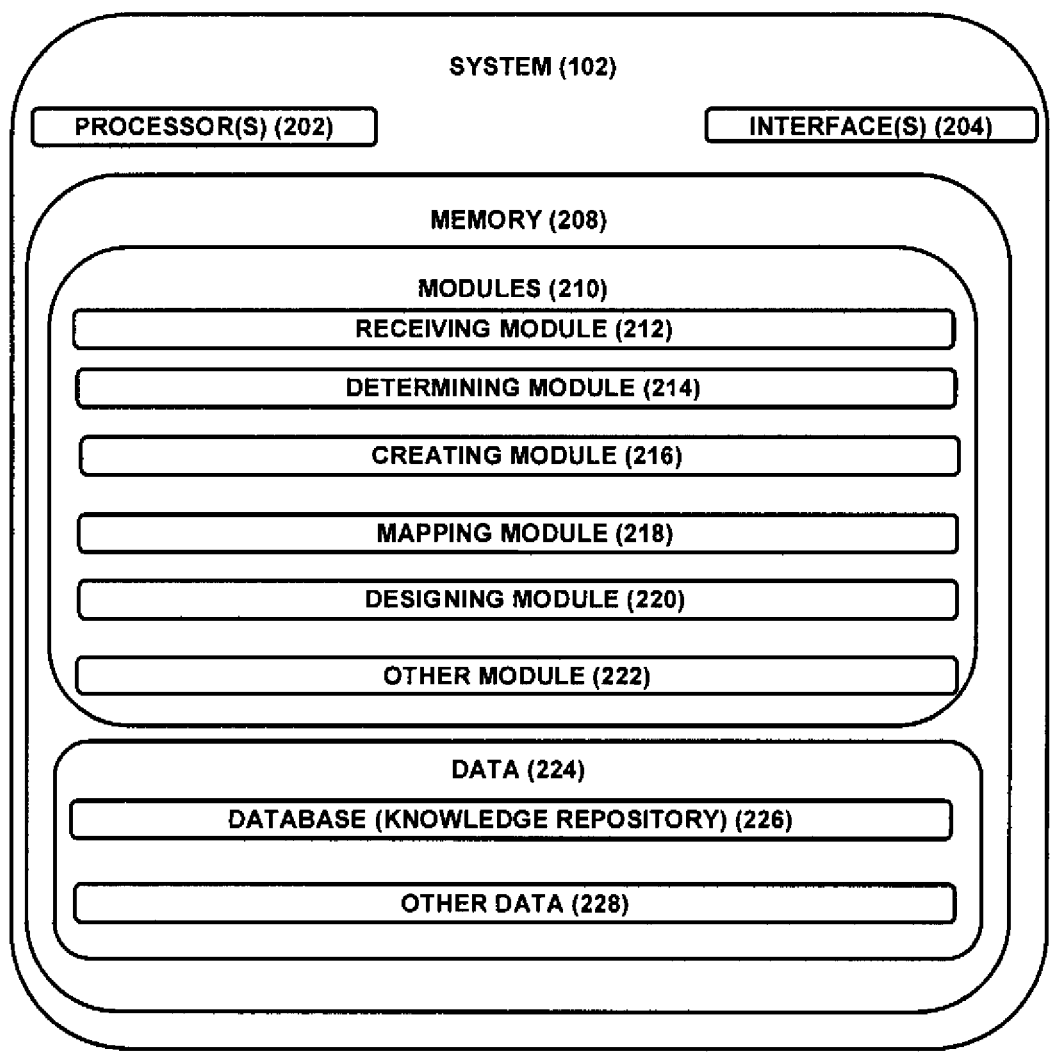
FIG. 2 illustrates the system for facilitating design configuration for providing management of the data center, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 208. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 208.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 208 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 208 may include modules 210 and data 224.

The modules 210 include routines, programs, objects, components, data structures, etc., which perform particular tasks, functions or implement particular abstract data types. In one implementation, the modules 210 may include a receiving module 212, a determining module 214, a creating module 216, a mapping extraction module 218, and a designing module 220. Other modules 222 may include programs or coded instructions that supplement applications and functions of the system 102.

The data 224, amongst other things, serves as a repository for storing data processed, received, and generated by one or more of the modules 222. The data 224 may also include a database (knowledge repository) 224, and other data 226. The other data 226 may include data generated as a result of the execution of one or more modules in the other module 220.

The present disclosure relates to system(s) and method(s) for facilitating design configuration of data center to provide management of data center. The system 102 receives requirements from the users and identifies objectives with respect to each phase from plurality of phases of life cycle of data center. Plurality of phases associated with the life cycle of the data center comprises monitoring and error detection, incident management, automated solution implemented through orchestration, system update and notification, deployment, configuration management, reporting, and dashboards.

Based on objectives, the system 102 provides configuration of tools associated with the life cycle and thus provides management of the data center.

The receiving module 212 receives input parameters from a user. The input parameters comprise design and operational requirements associated with the management of the data center. The input parameters are analyzed by the system 102 to understand the situational needs through evaluation of stakeholders, SLAs, deployment technologies such as servers, operating systems, databases and alike.

The determination module 214 is configured to use the input parameters to identify the objectives of the individual technologies supporting each phase from the plurality of phases of the data center life cycle. By way of a non-limiting example, the determination module 214 is configured to determine the objectives of an orchestration tool (individual technology) such that functioning of the orchestration tool ensures meeting the required SLA such as availability.

The determination module 214 is configured to provide capability to understand a situational context for determining objectives through analysis of the situation using input parameters such as:
  Stakeholder information such as Business hours, critical hours etc.
  Business objectives and SLAs.
  Organization structures and so on.

The creating module 216 is configured to create a generic configuration with respect to one or more services associated with the management of life cycle based on the objectives. The creation tool creates the generic configuration based on standard practices that will be most suitable for a given context. The generic configuration is created in the form of configuration data for each phase of the data center life cycle management which is independent of any implementation technology.

The system 102 further captures a context from multiple sources in an incremental manner through new plugins. The context is based on information extracted by discovery tools or from configuration management database or customer specific application. Context provides deployment information such as application xyz running in web server abc and is deployed in the server with IP address 2.3.4.5. Further, the plugins may include any plugins created for any standard technology such as Configuration Management Database (CMDB) and alike. The creating module 216 further creates an Intermediate Representation (IR) for configuration data for various aspects of the Data center life cycle management which is independent of any technology.

For example, if the data center provides RHEL (Red Hat Enterprise Linux) as a service, then determining the list of potential issues (objectives) that one might encounter gets worked out while creating the generic configuration of the RHEL.

The mapping module 218 is configured to map the generic configuration with a predefined set of configuration in order to obtain a technology specific format. The predefined set of configuration is stored in a Knowledge Repository 224.

The Knowledge Repository 224 contains domain knowledge for affectively managing data center life cycle. Knowledge consists of various standards, technology specific best practices, products available in the market in a form that is executable by the system 102. Domain knowledge comprises of the following:
  The associated qualities that are provided while a service is being delivered. For example, knowledge about required transaction latency that should get met while a service is being provided. The Knowledge Repository 224 maintains a generic list of such qualities as knowledge so that the solution can ensure such qualities.
  For each standard technology, Knowledge Repository 224 maintains a list of supporting knowledge related to the deployment and management of the same. E.g. the Knowledge Repository 224 maintains a list of parameters that need to be monitored for the Linux operating system along with an exhaustive list of issues and incidents that one might encounter while using Linux.

Knowledge Repository 224 maintains knowledge about the required governance structure with identified list of roles and responsibilities that need to be in place in all the stakeholder organizations such as customer, service provider and so on.

Knowledge Repository 224 maintains generic workflows which can be triggered when standard incidents occur all the way up to their resolution and closure.

Knowledge Repository 224 incorporates into its knowledge base, the standard processes defined by bodies like CMM (Capability Maturity Model), ITIL (Information Technology Infrastructure Library), COBIT (Control Objectives for Information and Related Technology), and so on to ensure that the solution abides by such standards.

Knowledge Repository 224 also incorporates in its knowledge base, the capabilities of the different technologies available in the market that supports the data center life cycle management.

Knowledge Repository 224 incorporates knowledge using which selection of the appropriate technology can be done for a given context.

The mapping module 218 further processes the tools knowledge to pick configuration from the Knowledge Repository 224 that is best suited for the specific tool.

deployment and execution of the technology independent solution (generic configuration).

Figure 3:
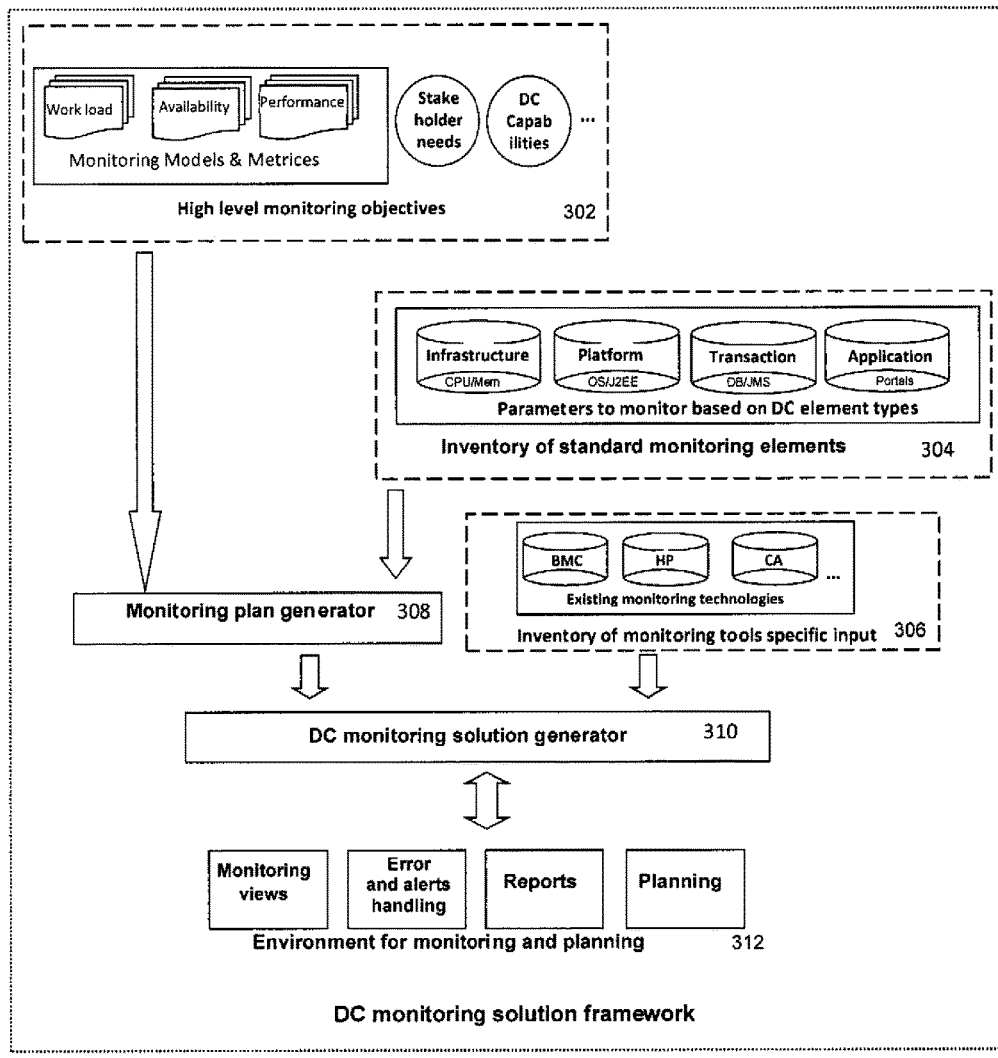
FIG. 3. Illustrates a process followed by system to create a monitoring solution for a data center, in accordance with an embodiment of the present subject matter.

In accordance with a non-limiting exemplary embodiment, the working of system 102 may be explained as follows by referring to FIG. 3:

After the input parameters are received, the determination module 214 determines high level objectives (or simply objectives).

High Level Monitoring Objectives (Step 302):

The high level monitoring objectives contains mechanism to analyse the situational data for which a monitoring solution needs to be implemented. The determination module 214 extracts information such as stake holder needs along with details such as workload, performance, availability and so on that needs to be checked by the monitoring solution. The system 102 also incorporates various knowledge modules (not shown in figure) configured to provide mechanism to translate such high level user need into the required monitoring strategy.

An example of such a situational data is shown below:

The table 1 provides information about the various resources that are deployed in the data centre that need monitoring.

TABLE 1

| BOUnit | ParameterName | ChildParameterName | AttributeName | AttributeValue |
|---|---|---|---|---|
| Administration | Recovery_Point_Objective | | frequency | 2 |
| | | | frequencyUnit | day |
| | Recovery_Time_Objective | | duration | 4 |
| | | | unit | Hour |
| Availability | Working_hours | | availability | 90.00% |
| | | | from | 8.00 AM |
| | | | To | 06:00:00 PM |

The designing module 220 is configured to design a tool specific configuration by using the technology specific format. The tool specific configuration provides management of each phase of the life cycle of the data center.

The designing module 220 is further configured to perform a product specific translation by means of translators (not shown in figure) to maintain various product specific translators which may translate the technology independent solution worked out by the system to finally generate the implementation technology specific configuration format for Inventory of Standard Monitoring Elements with Respect to Monitoring Phase of Life Cycle of the Data Centre (Step 304):

The system 102 contains a database (Knowledge Repository 224) of all the technology specific monitoring parameters along with associated attributes that needs monitoring. The Knowledge Repository 224 is a repository of best practices monitoring practices collected for various technologies from the respective monitoring Small and Medium Enterprise (SME's).

Below listed non limiting example shows a monitoring parameter of Linux OS along with associated knowledge present in the Knowledge Repository 214:

| Metric | Parameter | Importance | Type | Polling Interval In Sec | ThresholdLevel | EventName |
|---|---|---|---|---|---|---|
| Memory | Total_Memory | Vital | L1 | 120 | Memory_Used>75% | Lack of Total Memory |

Inventory of Monitoring Tool Specific Input (Step 306):

The Knowledge Repository 224 is further the database of monitoring tool specific configuration parameters. The Knowledge Repository 224 may be independently populated as and when newer monitoring technologies emerge in the market. The purpose of the Knowledge Repository 224 is to provide a way to map the elements that require monitoring in a Data Center with available monitoring technologies that can serve the purpose.

An example of the configuration parameter specific to the monitoring tool named Zabbix is shown below that gets captured in the database (Knowledge Repository 224).

TABLE 2

| Technology | ParameterName | CanMonitor | Min_Polling_frequency_in_Sec | Max_Polling_frequency_in_Sec |
|---|---|---|---|---|
| Memory | Total_Memory | TRUE | 1 | 130 |

TABLE 3

| Technology | ParameterName | Type | Key | value_type | delay |
|---|---|---|---|---|---|
| Memory | Total_Memory | 0 | vm.memory.size[total] | 3 | 1800 |

The first table (table 2) captures the capability of Zabbix with respect to Zabbix's support for monitoring Linux operating system while the second table (table 3) provides mapping between the monitoring parameter of Linux and the corresponding configuration item to be used in Zabbix.

Monitoring Plan Generator Through the Creating Module 216 (Step 308):

The creating module 216 is responsible for generating a monitoring plan for a specific Data Center taking into consideration the overall objectives e.g. concerns of all stakeholders like customers, deployed technologies and so on. The generated plan (generic configuration) takes into account the specific technology stack used in a particular Data Center and also incorporates into the monitoring strategy influence of aspects such as availability, workload, and performance and so on. For example, the creating module 216 selects appropriate parameter set for monitoring a Windows server to monitor its availability. An example of the generated monitoring plan is shown in the table below:

Data Center (DC) Monitoring Solution Generation Through the Designing Module 220 (Step 310):

The designing module 220 is responsible for creating or designing a monitoring solution that may be directly deployed in a Data Center. The output i.e. generated plan is used by the designing module 220 as an input. The designing module 220 translates the generated plan into monitoring solution technology specific configuration files (tool specific configuration). The plan translation activity also recommends the use of possible monitoring technology for realization based on associated factors like capability, cost and so on. These configuration files may be directly executed (manually or automatically) to configure a set of monitoring tools deployed or to be deployed in a DC.

```
define command{
command_name          check_linux_disk
command_line          path/check_disk -w 60 -c 85 -p
/data/
}
define command{
command_name          check_linux_mountpoing
command_line          path/check_mount
}
Define host{
    name    Default-host
    notifications_enabled       1
    event_handler_enabled       1
    flap_detection_enabled      1
    failure_prediction_enabled      1
    process_perf_data     1
    retain_status_information       1
    retain_nonstatus_information        1
    register      0
```

TABLE 4

| Server | OS | Technology | ParameterName | polling_Frequency | Threshold | Issue_Name |
|---|---|---|---|---|---|---|
| 192.168.249.45 | windows45 | Memory | Total_Memory | 3600 | Memory_Used>85% | Lack_of_Total_Memory |

-continued

```
}host{
    use                 Default-host
    host_name           Linux50
    alias               Virtualisation Host1
    address     192.168.249.50
    max_check_attempts  10
    notification_interval   120
    notification_period     24×7
    notification_options    d,r
```

Environment for Monitoring and Planning (Step 312):

The system 102 further comprise a final monitoring environment containing dashboard for different stakeholders, error viewer and handler, report generator, agents and so on that provides monitoring information of a particular Data Center in real time.

Figure 4:
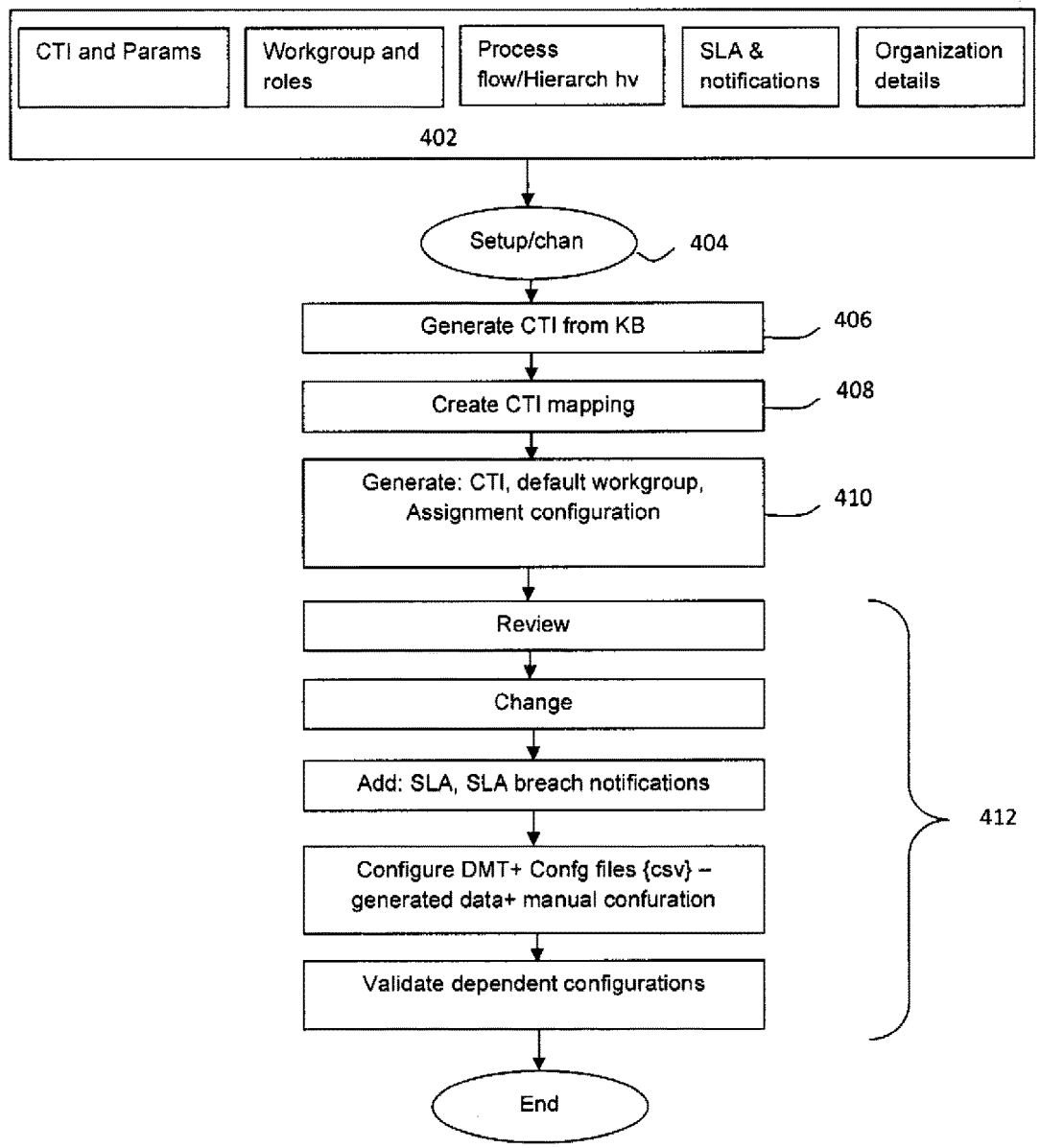
FIG. 4 illustrates steps in detail followed for determination of different types of objectives required to carry out the configuration of any IT service management (ITSM) tool, in accordance with an embodiment of the present subject matter.

The system 102 is further configured to perform incident management. The incident management refers to a phase of the life cycle of the data center. Referring to FIG. 4, as shown in step 402, the determining module 212 is configured to determine the different types of objectives by using the input parameter required to carry out the configuration of one or more tools to be used for incident management. Out of the different types of input parameters, one or more input parameters comprises factual knowledge such as list of Category-Type-Item (CTI), Workgroups with standard Roles and Responsibilities and so on which it maintains in its knowledge repository. For other types of input parameters, system 102 provides input formats using which a user may enter situation specific information.

The different types of configurable elements, for which the configuration data (specific configuration) through the creating module 216 needs to get generated for most standard tools to be used in the data center may be understood from the table 5 below:

Setup or Change Listener Through the Designing Module 220 (Step 404):

Under set or change listener event, the designing module 220 triggers execution of the Tools Configurator in order to generate the required configuration data for the deployment of various tools. Typically the designing module triggers the execution when a new Data Center is being setup, or if there is a change in the any of the input parameter that is critical enough to the trigger the execution.

Generation of Category-Type-Item (CTI) by the Designing Module 220 (Step 406) (Step 408):

In this step the Tools Configurator through the designing module 220 automatically generates the required configuration data pertaining to Category-Type-Item (CTI) for configuring ITSM tool in a technology or situation independent format. It does so based on the information stored in the knowledge Repository.

Manual Creation of CTI Mapping with the Help of System 102 (Step 408):

The auto generated CTI configuration for a particular situation or context may not conform to the situation specific protocol such as naming convention and alike. In this step the system 102 allows the user to make such situation specific protocol mapping manually.

Generation of Workgroup Details by the Creating Module 216 (Step 410):

As a part of this step the creating module 216 creates configuration data for a few more aspects. The few more aspects comprises workgroup, roles and responsibilities and alike that needs incorporation in ITSM tools. The creating module 216 creates configuration data for few aspects based on knowledge acquired from standard practices. In this step the creating module 216 also generates configuration files as per the formats expected by ITSM product such as Remedy and CCM.

TABLE 5

Configuration:

| | | Source | | |
|---|---|---|---|---|
| Sr. No. | Data | Factual | Situational | Remarks |
| 1 | CTI Values | CTIS | CTI to CTI mapping | For each customer/deployment the CTI for a ticket can be different. This has to be provided by the account team in form of a CTI to CTI mapping. |
| 2 | Service Operation Parameters | ConfigurationInfoUsed | None | Situational is None, but can be extended later to override param names |
| 3 | WorkGroup/Roles | WorkGroup | CTI to WorkGroup Mapping | It provides Roles & Responsibilities for each customer/deployment in the WorkGroup. Each Ticket will be associated with a specific WorkGroup. This has to be provided by the account team in the form of a CTI to Work Group mapping. |
| 4 | Process Flow | None | Business Rules | It provides the life cycle for the resolution of a ticket. It has default assignments based on automatic or manual resolution. |
| 5 | SLA & Notifications | None | Business Rules | Can be partly borrowed like Platinum/Gold/Silver and partly from situational data. |
| 6 | Organization details | None | OrganizationalData | Departments, People, Location, Business hours etc. How much of it can be a part of knowledge to be worked out. |

Review, Change, SLA, Deployment, Configuration Validation by the System 102 (Step 412):

Once the configuration data is generated, reviewing of the same all the way up to their deployment and testing need to be carried out. Although for now the process is manual, the possibility of automating parts of it will be taken up subsequently.

Figure 5:
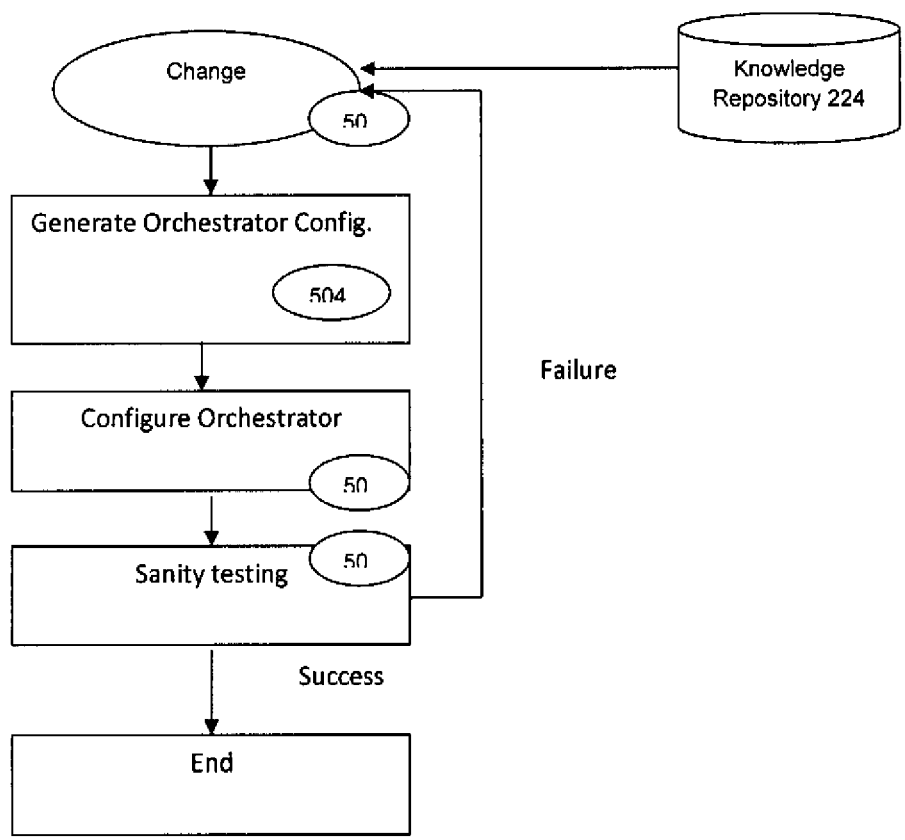
FIG. 5 illustrates the process of configuring automation technologies, in accordance with an embodiment of the present subject matter.

The system 102 further performs a process for configuring the automation of technologies such as Orchestrator. Steps involved in FIG. 5 are explained below:

Change (Step 502):

The event that triggers the automation process is typically a change request raised by users of the Data Center or internally through monitoring. The knowledge to implement the change available as part of the knowledge repository to the Tools Configurator. Once the change event is triggered the designing module pulls out the right knowledge from the knowledge base to automatically implement the change in the subsequent steps.

Generate Orchestrator Configuration (Step 504):

After picking the right knowledge to implement a specific change request, the designing module translates the generic configuration into Automation or Orchestration technology specific format and generates the required configuration files.

Configure Orchestrator (Step 506):

In this step the Orchestration tools are configured using the configuration files generated by the creating module.

Sanity Testing and Deployment (Step 508):

Both step 504 and 506 are steps to make sure that the generated configuration files serve the required purpose. The possibility to automate part of the process to be taken up subsequently.

The performance of the system 102 for generating generic configuration and later technology specific format by using the generic configuration may be understood from the points below:

Read knowledge from Knowledge Repository present 224 in the knowledge base.

Read knowledge about tools and their mapping maintained independently outside the knowledge base.

Read situational data CMDB/SLA/Customer specific information).

Generate IR for monitoring, ITSM and so on.

Invoke translators through the designing module 220 to generate individual tool specific configuration files.

Figure 6:
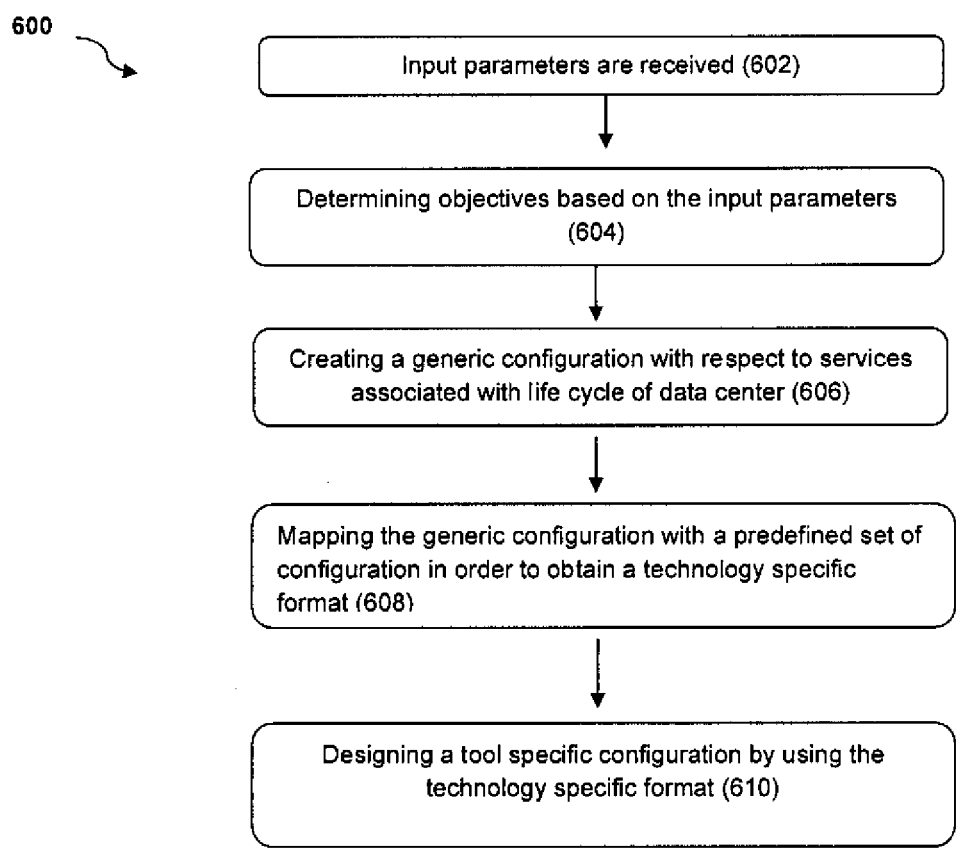
FIG. 6 illustrates a method for facilitating design configuration for providing management of the data center is shown, in accordance with an embodiment of the present subject matter

Referring to FIG. 6, the order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented in the above described system 102.

At block 602, input parameters are received by the receiving module.

At block 604, objectives are determined by using the input parameters. The objectives refer to one or more technical requirements with respect to each phase from plurality of phases associated with the life cycle of the data center.

At block 606, a generic configuration with respect to one or more services associated with the life cycle based on the objectives is created.

At block 608, the generic configuration is mapped with a predefined set of configuration in order to obtain a technology specific format. The predefined sets of configurations are stored in a knowledge repository.

At block 610, a tool specific configuration by using the technology specific format is designed. The tool specific configuration provides management of each phase of the life cycle of the data center.

The method 600 may be further explained by way of following example:

Input Details:

TABLE 6

Input data about deployed resources

| Server name | Address | Location | Resource type |
|---|---|---|---|
| Server 1 | 192.168.249.45 | ABC | Windows OS |

TABLE 7

Input and their objectives

| High level objective | Name | Attribute name | Attribute Value |
|---|---|---|---|
| Administration | Recovery point objective | Frequency | 2 |
| Availability | Availability for working hours | | 90.00% |

Processing Knowledge:

TABLE 8

Standard Monitoring Knowledge

| Metrics | Parameter | Polling interval in sec | Threshold level | Event name |
|---|---|---|---|---|
| Linux_Memory | Total_Memory | 120 | Memory_used > 75% | Lack of total memory |

TABLE 9

Knowledge about monitoring technologies

| Target Technology | Parameter name | Can monitor | Min Polling interval | Max polling interval | Config. Item map |
|---|---|---|---|---|---|
| Linux_memory | Total_memory | TRUE | 1 | 130 | Vm.memory.size[total] |

Generated Output:

TABLE 10

Example of a part of the generated monitoring plan

| Server | Monitoring target | Parameter | Polling interval |
|---|---|---|---|
| 192.168.249.45 | Linux memory | Total memory | 3600 |

```
define command{
command_name          check_linux_disk
command_line          path/check_disk -w 60 -c 85 -p
/data/
}
define command{
command_name          check_Linux_mountpoing
command_line          path/check_mount
}
Define host{
    name      Default-host
    notifications_enabled       1
    event_handler_enabled       1
    flap_detection_enabled      1
    failure_prediction_enabled  1
    process_perf_data   1
    retain_status_information   1
    retain_nonstatus_information    1
    register  0
}host{
    use             Default-host
    host_name       Linux50
    alias           Virtualisation Host1
    address    192.168.249.50
    max_check_attempts   10
    notification_interval   120
    notification_period     24x7
    notification_options    d,r
- <zabbix_import version="1.0" date="21.08.13" time="16:27">
 - <hosts>
  - <host name="windows45">
    <proxy_hostid>0</proxy_hostid>
    <useip>1</useip>
    <dns />
    <ip>192.168.249.45</ip>
    <port>10050</port>
    <status>0</status>
    <useipmi>0</useipmi>
    <ipmi_ip />
    <ipmi_port>623</ipmi_port>
    <ipmi_authtype>0</ipmi_authtype>
    <ipmi_privilege>2</ipmi_privilege>
    <ipmi_username />
    <ipmi_password />
   - <groups>
      <group>Templates</group>
     </groups>
   - <items>
    - <item type="0" key="vm.memory.size[total]" value_type="3">
       <description>Total Memory</description>
       <delay>130</delay>
```

Above are listed, configuration file for Nagios

The written description describes the subject matter herein to enable any person skilled in the art to make and use the embodiments of the invention. The scope of the subject matter embodiments are defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A method for facilitating design configuration of a data center for providing management of the data center, the method comprising:

receiving input parameters from a user, wherein the input parameters comprise design and operational requirements associated with the management of the data center and at least one situational need with respect to stakeholders, Service Level Agreements and deployment technologies;

determining objectives based on analysis of the input parameters, wherein the objectives refer to at least one technical requirement with respect to each phase from plurality of phases associated with a life cycle of the data center;

creating a generic configuration with respect to at least one service associated with the life cycle based on the objectives and context captured from multiple sources in an incremental manner through plugins, wherein the generic configuration is created in the form of configuration data for each phase of the plurality of phases of the life cycle of the data center;

mapping the generic configuration with a predefined set of configuration in order to obtain an automation technology specific format in response to a change request based on monitoring the data center, wherein the predefined set of configuration is stored in a knowledge repository, and wherein mapping the generic configuration further comprises translating the generic configuration into the automation technology specific format by selecting a solution from the knowledge repository to automatically implement the change request and generate configuration files that are automatically executed to configure a set of monitoring tools deployable in the data center, wherein the knowledge repository monitors tool specific configuration parameters and independently populates when newer monitoring technologies emerge; and designing a tool specific configuration by using the automation technology specific format, wherein the tool specific configuration provides management of each phase of the life cycle of the data center and performing a product specific translation to generate a technology specific configuration format for deployment and execution of the generic configuration.

2. The method of claim 1, wherein the plurality of phases associated with the life cycle of the data center comprises at least one of monitoring and error detection, incident management, automated solution through orchestration, system update and notification, deployment, configuration management, reporting, and dashboards.

3. The method of claim 1, wherein the deployment technologies further comprise at least one of servers, operating systems, and databases.

4. The method of claim 1, further comprising implementing the tool specific configuration in order to provide deployment of at least one tool to provide the at least one service.

5. The method of claim 1, wherein the predefined set of configuration comprises at least one of standards, technology specific best practices, and information with respect to market-available products.

6. The method of claim 1, wherein the predefined set of configuration further comprises domain knowledge to provide management of the data center.

7. The method of claim 1, further comprising generating alerts with regard to management of services and tools associated with each phase of the life cycle of the data center.

8. A system for facilitating design configuration of a data center for providing management of the data center, the system comprising:
a knowledge repository;
a processor; and
a memory coupled to the processor, wherein the processor executes a plurality of modules stored in the memory, and wherein the plurality of modules comprise:
a receiving module configured to receive input parameters from a user, wherein the input parameters comprise design and operational requirements associated with the management of the data center and at least one situational need with respect to stakeholders, Service Level Agreements and deployment technologies;
a determining module configured to determine objectives based on analysis of the input parameters, wherein the objectives refer to at least one technical requirement with respect to each phase of the plurality of phases of a life cycle of the data center;
a creating module configured to create a generic configuration with respect to at least one service associated with the life cycle based on the objectives and context captured from multiple sources in an incremental manner through plugins, wherein the generic configuration is created in the form of configuration data for each phase of the plurality of phases of the life cycle of the data center;
a mapping module configured to map the generic configuration with a predefined set of configuration in order to obtain an automation technology specific format in response to a change request based on monitoring the data center, wherein the predefined set of configuration is stored in the knowledge repository and wherein mapping the generic configuration further comprises translating the generic configuration into the automation technology specific format by selecting a solution from the knowledge repository to automatically implement the change request and generate configuration files that are automatically executed to configure a set of monitoring tools deployable in the data center, wherein the knowledge repository monitors tool specific configuration parameters and independently populate when newer monitoring technologies emerge; and
a designing module configured to design a tool specific configuration by using the automation technology specific format, wherein the tool specific configuration provides management of each phase of the life cycle of the data center and perform a product specific translation to generate a technology specific configuration format for deployment and execution of the generic configuration.

9. The system of claim 8, wherein the knowledge repository is configured to store at least one of standards, technology specific best practices, and information with respect to products available in the market.

10. The system of claim 8, wherein the plurality of phases of the life cycle of the data center further comprise at least one of monitoring and error detection, incident management, automated solution through orchestration, system update and notification, deployment, configuration management, reporting, and dashboards.

11. The system of claim 8, wherein the deployment technologies further comprise at least one of servers, operating systems, and databases.

12. The system of claim 8, wherein alerts are generated with regards to management of services and tools associated with each phase of the life cycle of the data center.

13. A non-transitory computer readable medium embodying a program executable in a computing device, the program comprising:
a program code for receiving input parameters from a user, wherein the input parameters comprise design and operational requirements associated with the management of a data center and at least one situational need with respect to stakeholders, Service Level Agreements and deployment technologies;
a program code for determining objectives based on analysis of the input parameters, wherein the objectives refer to at least one technical requirement with respect to each phase of plurality of phases associated with a life cycle of the data center;
a program code for creating a generic configuration with respect to at least one service associated with the life cycle based on the objectives and context captured from multiple sources in an incremental manner through plugins, wherein the generic configuration is created in the form of configuration data for each phase of the plurality of phases of the life cycle of the data center;
a program code for mapping the generic configuration with a predefined set of configuration in order to obtain an automation technology specific format in response to a change request based on monitoring the data center, wherein the predefined set of configuration is stored in a knowledge repository and wherein mapping the generic configuration further comprises translating the generic configuration into the automation technology specific format by selecting a solution from the knowledge repository to automatically implement the change request and generate configuration files that are automatically executed to configure a set of monitoring tools deployable in the data center, wherein the knowledge repository monitors tool specific configuration parameters and independently populate when newer monitoring technologies emerge; and a program code for designing a tool specific configuration by using the automation technology specific format, wherein the tool specific configuration provides management of each phase of the life cycle of the data center and performing a product specific translation to generate a technology specific configuration format for deployment and execution of the generic configuration.

14. The program of claim 13, wherein the knowledge repository stores at least one of standards, technology specific best practices, and information with respect to products available in the market.

15. The program of claim 13, wherein the plurality of phases associate with the life cycle of the data center further comprise at least one of monitoring and error detection, incident management, automated solution through orchestration, system update and notification, deployment, configuration management, reporting, and dashboards.

16. The program of claim 13, wherein the deployment technologies further comprise at least one of servers, operating systems, and databases.

17. The program of claim 13, further comprising a program code for generating alerts with regard to management of services and tools associated with each phase of the life.

* * * * *